(12) United States Patent
Shibata et al.

(10) Patent No.: US 8,288,902 B2
(45) Date of Patent: Oct. 16, 2012

(54) THERMISTOR DEVICE PREVENTING DEFORMATION OF THERMISTOR ELEMENT, AND PREVENTING FIRST CONDUCTIVE PLATE FROM DIRECTLY CONDUCTED TO SECOND CONDUCTIVE PLATE

(75) Inventors: Kazuma Shibata, Hamamatsu (JP);
Yasuhiro Fukatsu, Hamamatsu (JP);
Ryousuke Sakamaki, Kosai (JP);
Manabu Kato, Kosai (JP)

(73) Assignee: ASMO Co., Ltd., Kosai-Shi, Shizuoka-Ken (JP)

( * ) Notice: Subject to any disclaimer, the term of this patent is extended or adjusted under 35 U.S.C. 154(b) by 275 days.

(21) Appl. No.: 12/332,186

(22) Filed: Dec. 10, 2008

(65) Prior Publication Data

US 2009/0153000 A1 Jun. 18, 2009

(30) Foreign Application Priority Data

Dec. 14, 2007 (JP) .................................. 2007-323608
Nov. 4, 2008 (JP) .................................. 2008-283565

(51) Int. Cl.
*H02K 13/06* (2006.01)
*H02K 11/04* (2006.01)
*H02K 13/04* (2006.01)

(52) U.S. Cl. ............ 310/68 C; 310/71; 310/72; 361/27; 361/106

(58) Field of Classification Search ............... 310/68 C, 310/68 R, 71, 72, 220, 229, 66; 361/27, 361/31, 105, 106; *H02K 11/00, 11/04, 13/04, H02K 13/06*
See application file for complete search history.

(56) References Cited

U.S. PATENT DOCUMENTS

| 5,010,264 A | * | 4/1991 | Yamada et al. | .................. 310/72 |
| 5,294,851 A | * | 3/1994 | Tajima et al. | ................ 310/68 C |
| 2006/0163956 A1 | * | 7/2006 | Sahashi et al. | .............. 310/68 C |

FOREIGN PATENT DOCUMENTS

JP 2003-151806 5/2003

* cited by examiner

*Primary Examiner* — Quyen Leung
*Assistant Examiner* — Michael Andrews
(74) *Attorney, Agent, or Firm* — Workman Nydegger (57) ABSTRACT

A thermistor device configures part of an electrical path from a motor feeder section to an armature. A recess defining wall defines an accommodating recess, which accommodates the thermistor device. The thermistor device includes a plate-like thermistor element. A first conductive plate and a second conductive plate sandwich the thermistor element. A pair of first projections 22*b* are provided at the distal end of the first conductive plate in the insertion direction. A pair of second projections 23*b* are provided at the distal end of the second conductive plate in the insertion direction. The first projections and the second projections abut against the recess bottom wall in a range that corresponds to the thermistor device except the thermistor element.

3 Claims, 7 Drawing Sheets

THERMISTOR DEVICE PREVENTING DEFORMATION OF THERMISTOR ELEMENT, AND PREVENTING FIRST CONDUCTIVE PLATE FROM DIRECTLY CONDUCTED TO SECOND CONDUCTIVE PLATE

BACKGROUND OF THE INVENTION

The present invention relates to a motor, a thermistor device, and a method for manufacturing the thermistor device. The motor is provided with the thermistor device.

Figure 10:
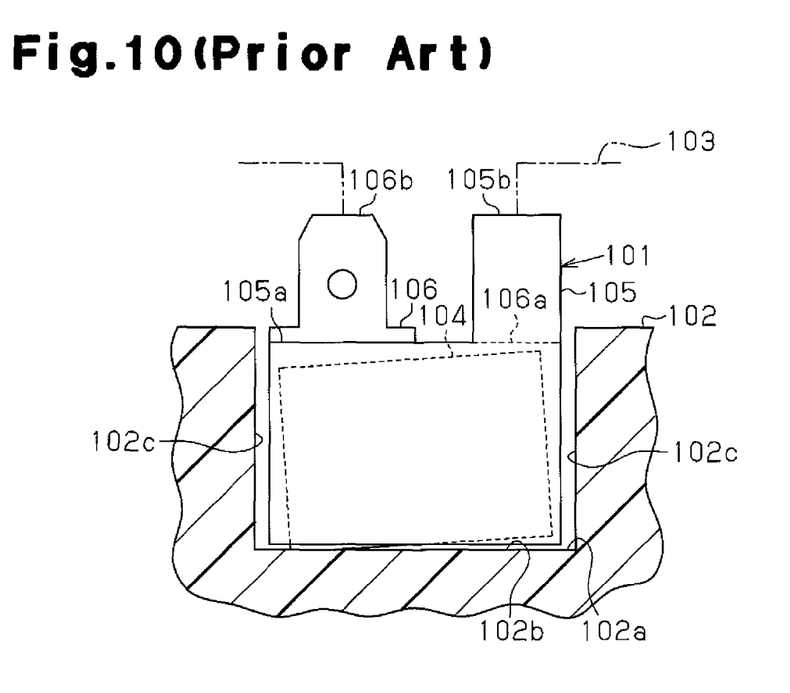
FIG. 10 is a longitudinal cross-sectional view illustrating a prior art thermistor device and an accommodating recess.

FIG. 10 shows a case where a thermistor device 101 of JP 3857571B (Japanese Patent No. 3857571) is accommodated in an accommodating recess 102a formed in an end bracket 102 of a motor. The thermistor device 101 is electrically connected to a motor feeder section 103.

The thermistor device 101 includes a plate-like thermistor element 104, a first conductive plate 105, and a second conductive plate 106. The first conductive plate 105 and the second conductive plate 106 sandwich the thermistor element 104. A first sandwiching portion 105a and a second sandwiching portion 106a, which are rectangles slightly larger than the thermistor element 104, are electrically connected and secured to the thermistor element 104 by soldering. A first terminal 105b and a second terminal 106b project outside the accommodating recess 102a.

Figure 11:
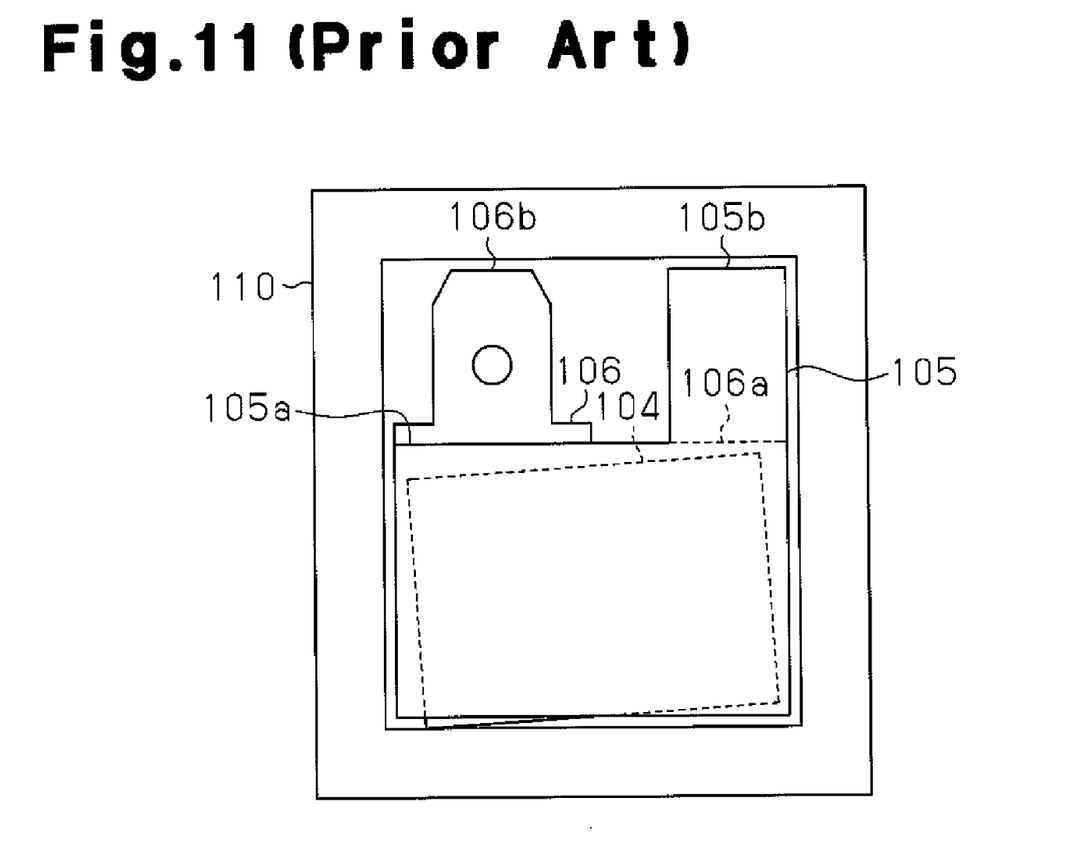
FIG. 11 is a front view illustrating a mold used in a method for manufacturing the thermistor device of FIG. 10.

FIG. 11 shows a mold 110 for soldering the thermistor device 101. The second conductive plate 106, solder, the thermistor element 104, solder, and the first conductive plate 105 are laminated in the mold 110 in this order, and the solder is heated.

The size of the mold 110 is set such that a slight space is provided between the mold 110 and the first conductive plate 105 and the second conductive plate 106. This is to facilitate the first conductive plate 105 and the second conductive plate 106 to be put in and removed from the mold 110. Therefore, the thermistor element 104 might be displaced in the mold 110 so that it slightly projects from the first sandwiching portion 105a and the second sandwiching portion 106a as shown by a broken line in FIG. 11.

The thermistor element 104 shown by a broken line in FIG. 10 might abut against a bottom wall 102b or recess side walls 102c of the accommodating recess 102a when accommodated in the accommodating recess 102a. As a result, the thermistor element 104 might be deformed. Furthermore, the solder attached to the thermistor element 104 might be squeezed out of the first conductive plate 105 and the second conductive plate 106, and squashed by the bottom wall 102b or the recess side walls 102c. As a result, the first conductive plate 105 might be short-circuited to the second conductive plate 106 by the squashed solder and not via the thermistor element 104.

SUMMARY OF THE INVENTION

Accordingly, it is an objective of the present invention to provide a thermistor device that prevents deformation of a thermistor element, and prevents a first conductive plate from being directly conducted to a second conductive plate. Furthermore, the present invention provides a method for manufacturing the thermistor device, and a motor including the thermistor device.

One aspect of the present invention provides a motor powered by a power source. The motor includes an armature; a feeder section; a thermistor device that is electrically connected to the feeder section so as to configure part of an electrical path from the feeder section to the armature; and an accommodating and retaining member including a recess defining wall. The feeder section is electrically connectable to the power source. The recess defining wall defines an accommodating recess for accommodating the thermistor device. The thermistor device includes a plate-like thermistor element including a first flat surface and a second flat surface facing away from one another. The thermistor device is inserted in the accommodating recess along the first flat surface. A first conductive plate and a second conductive plate sandwich the thermistor element. Changes in electric resistance of the thermistor element in accordance with temperature changes is greater than changes in electric resistance of each of the first conductive plate and the second conductive plate. The first conductive plate includes a first sandwiching portion secured to the first flat surface by a first conductive connecting member. The second conductive plate includes a second sandwiching portion secured to the second flat surface by a second conductive connecting member. The shape of the first sandwiching portion is substantially the same as the shape of the first flat surface. The shape of the second sandwiching portion is substantially the same as the shape of the second flat surface. At least one of the first conductive plate, the second conductive plate, and the recess defining wall is provided with a projection. When the projection is provided on at least one of the first conductive plate and the second conductive plate, the following is true. That is, the projection abuts against the recess defining wall in a range that corresponds to the thermistor device except the thermistor element when the thermistor device is viewed from a direction extended from the first flat surface in a state where the thermistor device is accommodated in the accommodating recess. When the projection is provided on the recess defining wall, the following is true. That is, the projection abuts against the thermistor device in a range that corresponds to the thermistor device except the thermistor element when the thermistor device is viewed from a direction extended from the first flat surface in a state where the thermistor device is accommodated in the accommodating recess.

Furthermore, one aspect of the present invention provides a thermistor device. The thermistor device includes a plate-like thermistor element, a first conductive plate and a second conductive plate sandwiching the thermistor element. At least one of the first conductive plate and the second conductive plate is provided with a projection. The periphery of each of the first sandwiching portion and the second sandwiching portion is provided with an abutment end, which abuts against a mount portion when the thermistor device is mounted on the mount portion. The projection projects from part of the abutment end when the first sandwiching portion and the second sandwiching portion are viewed from a direction perpendicular to the first flat surface.

Furthermore, one aspect of the present invention provides a method for manufacturing the thermistor device. The method includes preparing a plate-like thermistor element including a first flat surface and a second flat surface facing away from one another and preparing a first conductive plate and a second conductive plate. The manufacturing method further includes laminating the first conductive plate, the first conductive connecting member, the thermistor element, the second conductive connecting member, and the second conductive plate in a mold in this order. The mold includes a mold protrusion. The mold protrusion protrudes toward the abutment end, while avoiding the projection. By heating the first conductive connecting member and the second conductive connecting member in the mold, the first sandwiching portion is secured to the first flat surface by the first conductive connecting member and the second sandwiching portion is secured to the second flat surface by the second conductive connecting member.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENTS

FIGS. 1 to 4 show a first embodiment of the present invention.

Figure 1:
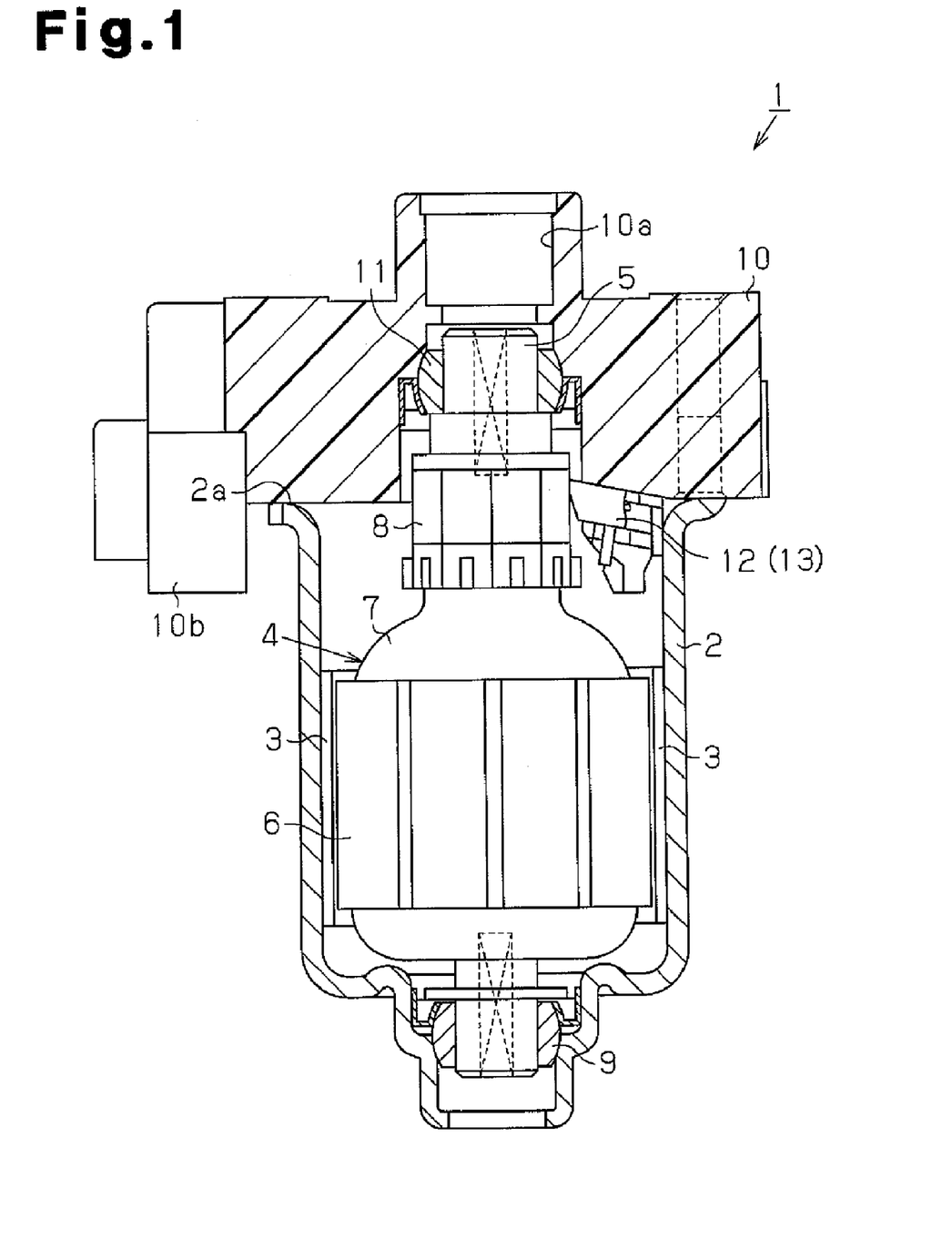
FIG. 1 is a longitudinal cross-sectional view illustrating a motor according to a first embodiment of the present invention.

FIG. 1 shows a motor 1 according to the first embodiment. The motor 1 can be used as a driving source of a power seat apparatus of a vehicle. The motor 1 can be mounted on a mechanism part of the seat. That is, the motor 1 can be mounted on the mechanism part that slides the seat back and forth. The motor 1 can also be mounted on the mechanism part that tilts the backrest of the seat.

The motor 1 includes a yoke 2 and an end bracket 10. The yoke 2 is substantially cup-shaped and is made of magnetic metal. The end bracket 10 closes an open end 2a of the yoke 2. Magnets 3 are secured to the inner circumferential surface of the yoke 2. The number of the magnetic poles of the magnets 3 according to the present embodiment is four.

An armature 4 is rotatably accommodated in the yoke 2. The armature 4 includes a rotary shaft 5, a core 6, coils 7, and a commutator 8. The core 6 and the commutator 8 are secured to the rotary shaft 5 to rotate integrally with the rotary shaft 5. The coils 7 are wound around the core 6. The commutator 8 is connected to the coils 7. The commutator 8 is located between the end bracket 10 and the core 6. A first bearing 9 is provided at the center of the bottom wall of the yoke 2. A second bearing 11 is provided at the center of the end bracket 10. The first bearing 9 and the second bearing 11 rotatably support the rotary shaft 5.

Figure 2:
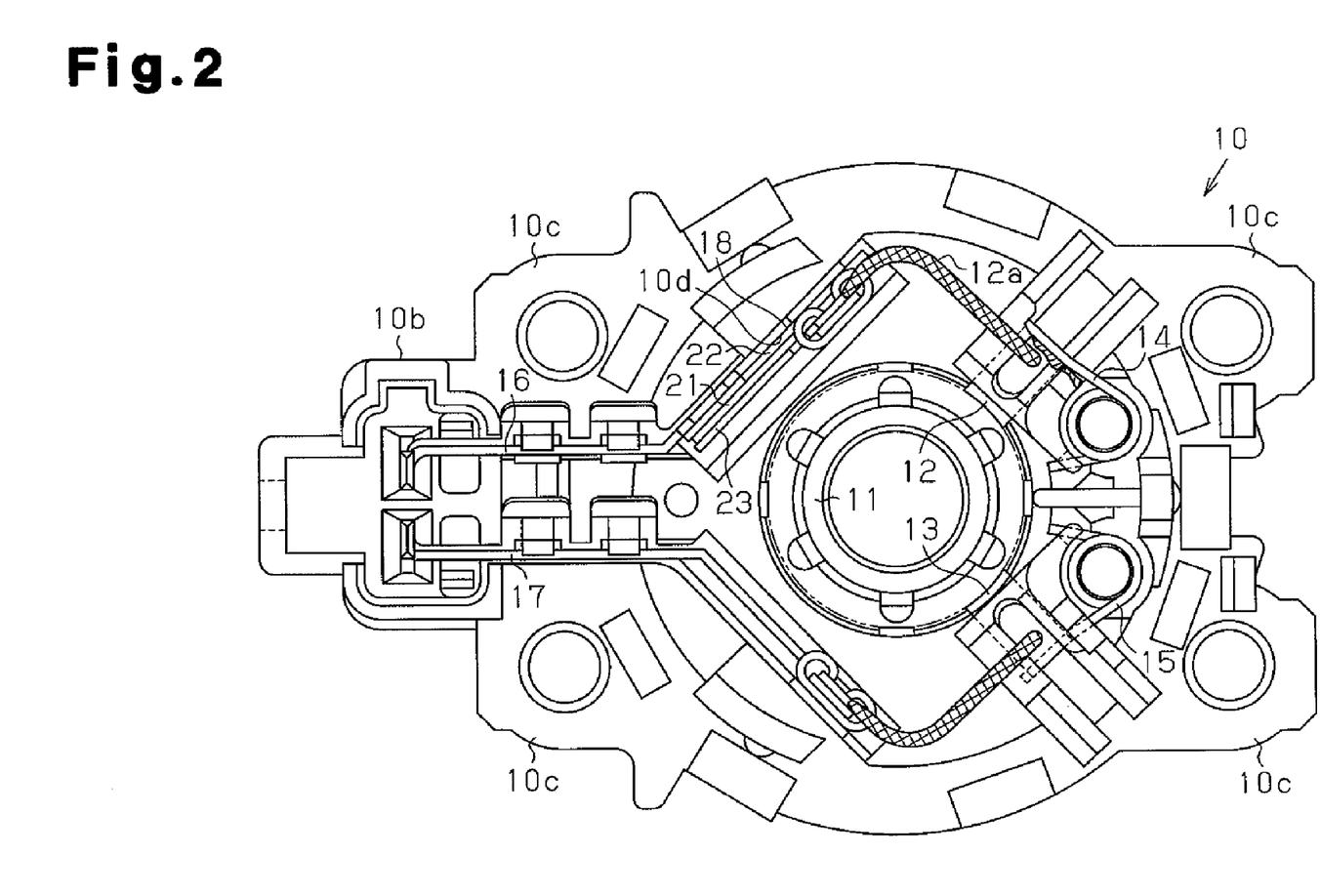
FIG. 2 is a bottom view illustrating the end bracket of the motor of FIG. 1.

As shown in FIG. 2, the end bracket 10 is substantially disk-shaped corresponding to the open end 2a of the yoke 2, and is made of resin. A through hole 10a for holding the second bearing 11 is provided at the center of the end bracket 10. The distal end of the rotary shaft 5 extends through the through hole 10a, and is coupled to a coupling portion of a load device.

A substantially cylindrical connector portion, which is a motor connector 10b, is provided integrally with the end bracket 10. An external connector of a control device (power supply apparatus), which is not shown, is fitted to the motor connector 10b. The external connector extends along the axial direction of the armature 4. The motor connector 10b projects outside of the yoke 2 as viewed from the axial direction of the armature 4. As shown in FIG. 2, four securing parts 10c are provided around the end bracket 10. Each securing part 10c has a bolt insertion hole. The motor connector 10b extends between the two securing parts 10c on the left side in FIG. 2 and further projects outward, and then extends in the axial direction. In FIG. 1, the motor connector 10b extends downward along the yoke 2.

As shown in FIG. 2, a first feeder brush 12, a second feeder brush 13, a first torsion coil spring 14, a second torsion coil spring 15, a first feeder section 16, a second feeder section 17, and a thermistor device 18 are mounted on the surface of the end bracket 10 facing the inside of the yoke 2. The first feeder brush 12 and the second feeder brush 13 are arranged inside a substantially circular part corresponding to the open end 2a of the yoke 2 as viewed from the axial direction of the armature 4. The first feeder brush 12 and the second feeder brush 13 are retained to be movable in the radial direction of the rotary shaft 5. The first torsion coil spring 14 urges the first feeder brush 12 and the second torsion coil spring 15 urges the second feeder brush 13 radially inward such that the first feeder brush 12 and the second feeder brush 13 are pressed against the commutator 8. The first feeder section 16 and the second feeder section 17 extend from the motor connector 10b to the inside of the open end 2a of the yoke 2. A pigtail 12a of the first feeder brush 12 is electrically connected to the first feeder section 16 via the thermistor device 18. The second feeder brush 13 is electrically connected to the second feeder section 17.

The end bracket 10 includes a mounted portion, which is an accommodating recess 10d. The accommodating recess 10d accommodates and retains the thermistor device 18. That is, the end bracket 10 is a mount member to which the thermistor device 18 is mounted, and is an accommodating and retaining member including the accommodating recess 10d.

Figure 3:
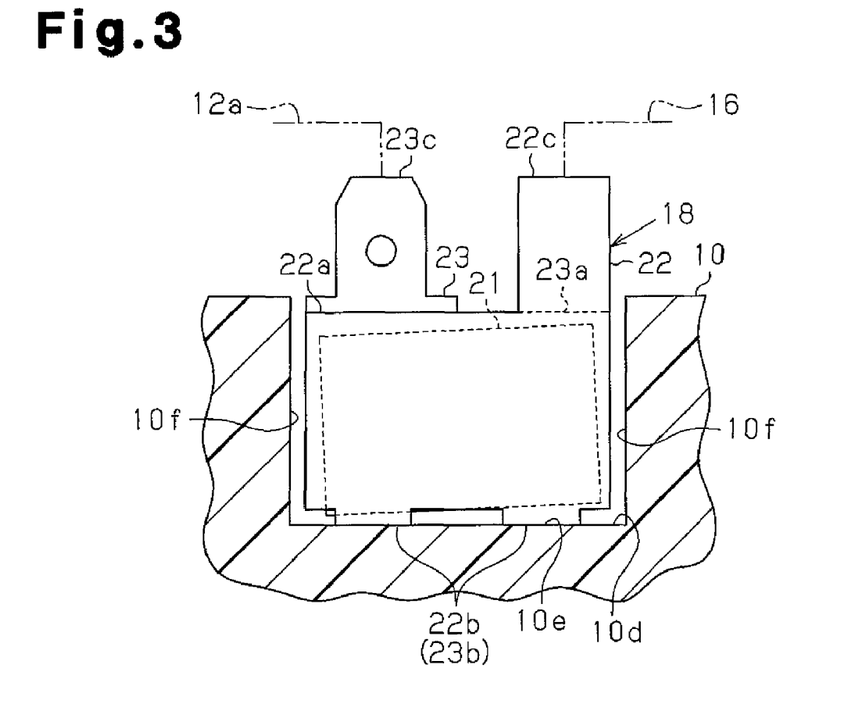
FIG. 3 is a longitudinal cross-sectional view illustrating the thermistor device and the accommodating recess of FIG. 2.

As shown in FIGS. 2 and 3, the thermistor device 18 includes a thermistor element 21, a first conductive plate 22, and a second conductive plate 23. The first conductive plate 22 and the second conductive plate 23 sandwich and retain the thermistor element 21. As viewed in FIG. 3, the first conductive plate 22 is located in front of the thermistor element 21, and the second conductive plate 23 is located at the back of the thermistor element 21.

The thermistor element 21 is a PTC element that has characteristics of PTC (PTC=Positive Temperature Coefficient). That is, changes in electric resistance of the thermistor element 21 in accordance with temperature changes is greater than changes in electric resistance of the first conductive plate 22 and the second conductive plate 23. The thermistor element 21 is a rectangular plate including a first flat surface and a second flat surface, which face away from one another.

As shown in FIG. 3, the first conductive plate 22 includes a first sandwiching portion, which is a first sandwiching portion 22a. The second conductive plate 23 includes a second sandwiching portion, which is a second sandwiching portion 23a. The first sandwiching portion 22a is electrically connected and secured to the first flat surface of the thermistor element 21 by a first conductive connecting member, which is first solder. The second sandwiching portion 23a is electrically connected and secured to the second flat surface of the thermistor element 21 by a second conductive connecting member, which is second solder. The first solder and the second solder are the same kind of solder. The first sandwiching portion 22a and the second sandwiching portion 23a have substantially the same shape as the thermistor element 21, and have a rectangular shape slightly larger than the thermistor element 21. The first conductive plate 22 and the second conductive plate 23 according to the present embodiment are copper plates.

The end bracket 10 includes a recess bottom wall 10e and a pair of recess side walls 10f, which define the accommodating recess led. That is, the recess bottom wall 10e and the recess side walls 10f are recess defining walls defining the accommodating recess 10d. In the present embodiment, the thermistor device 18 is inserted in the accommodating recess 10d along the rotary shaft 5. That is, the insertion direction of the thermistor device 18 is the axial direction of the motor 1. The insertion direction of the thermistor device 18 is along the first flat surface and the second flat surface of the thermistor element 21. The direction perpendicular to the thermistor element 21 is referred to as a flat surface perpendicular direction. The pair of recess side walls 10f are located on both sides of the thermistor device 18 as viewed from the flat surface perpendicular direction of the thermistor device 18. That is, the pair of recess side walls 10f face a direction perpendicular to the insertion direction.

As shown in FIG. 3, the first conductive plate 22 includes a first terminal 22c, which projects from the first sandwiching portion 22a along the first sandwiching portion 22a. The second conductive plate 23 includes a second terminal 23c, which projects from the second sandwiching portion 23a along the second sandwiching portion 23a. The first terminal 22c and the second terminal 23c project outside of the accommodating recess 10d. When the direction perpendicular to the first sandwiching portion 22a is referred to as the flat surface perpendicular direction, the first terminal 22c and the second terminal 23c are located at the opposite ends of the thermistor device 18 as viewed from the flat surface perpendicular direction. The first terminal 22c is located on the right end of the thermistor device 18 in FIG. 3, and the second terminal 23c is located on the left end of the thermistor device 18 in FIG. 3. The first feeder section 16 is electrically connected to the first terminal 22c, and the pigtail 12a is electrically connected to the second terminal 23c.

As shown in FIG. 3, the first conductive plate 22 includes a pair of first projections 22b, which extend toward the recess bottom wall 10e. The second conductive plate 23 includes a pair of second projections 23b, which extend toward the recess bottom wall 10e. The first projections 22b and the second projections 23b abut against the recess bottom wall 10e. That is, the first projections 22b project in the opposite direction to the first terminal 22c. The second projections 23b project in the opposite direction to the second terminal 23c. That is, the first projections 22b project from part of the periphery of the first sandwiching portion 22a along the first sandwiching portion 22a as viewed from the flat surface perpendicular direction. The second projections 23b project from part of the periphery of the second sandwiching portion 23a along the second sandwiching portion 23a as viewed from the flat surface perpendicular direction.

In a state where the thermistor device 18 is accommodated in the accommodating recess 10d, the first projections 22b abut against the recess bottom wall 10e in a range that corresponds to the thermistor device 18 except the thermistor element 21 as viewed from the direction along the first sandwiching portion 22a, for example, as viewed from the left side or the right side in FIG. 3. That is, the first projections 22b prevent the thermistor element 21 from abutting against the recess bottom wall 10e. The first projections 22b are located at the distal end of the first conductive plate 22 facing the recess bottom wall 10e. The distal end of the first conductive plate 22 is the end of the thermistor device 18 in the insertion direction.

If the first projections 22b and the second projections 23b are omitted, the distal end of the thermistor device 18 abuts against the recess bottom wall 10e. The distal end and the pair of side surfaces of the thermistor device 18 are referred to as an abutment end during installation. The first projections 22b are located at part of the abutment end during installation.

Similarly, the second projections 23b abut against the recess bottom wall 10e in a range that corresponds to the thermistor device 18 except the thermistor element 21. That is, the second projections 23b prevent the thermistor element 21 from abutting against the recess bottom wall 10e. The second projections 23b are located at the distal end of the first conductive plate 22.

Figure 4:
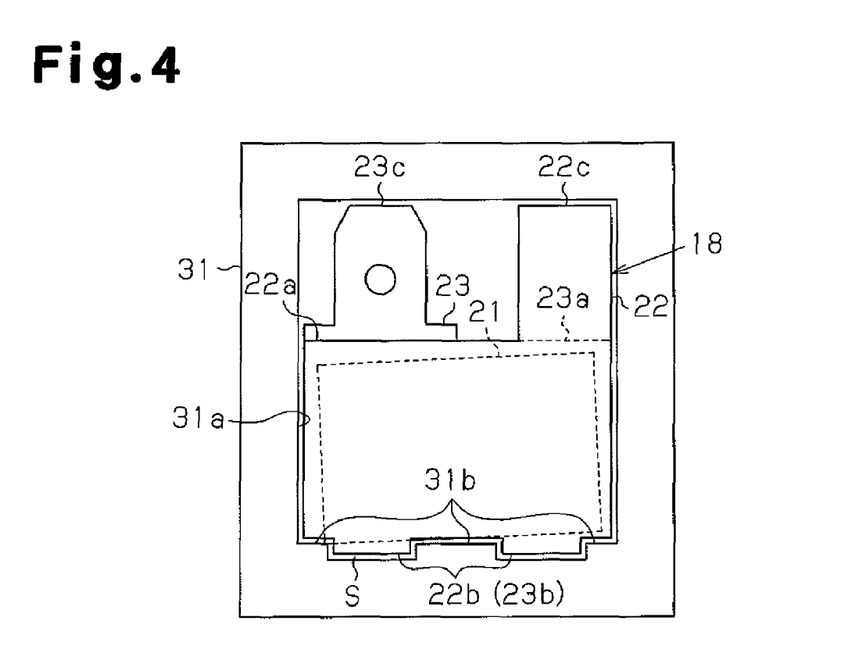
FIG. 4 is a front view illustrating a mold used in a method for manufacturing the thermistor device of FIG. 3.

FIG. 4 shows a mold 31 used in a method for manufacturing the thermistor device 18.

The manufacturing method includes preparing the thermistor element 21, the first conductive plate 22, and the second conductive plate 23.

In a fixing process, the first conductive plate 22, the first solder, the thermistor element 21, the second solder, and the second conductive plate 23 are laminated in this order in a recess of the mold 31, which is a mold recess 31a, as shown in FIG. 4. In this laminated state, the solder is heated so that the first sandwiching portion 22a and the second sandwiching portion 23a are soldered to the thermistor element 21. That is, the solder is melted and then solidified.

The mold 31 includes three mold protrusions 31b, which project in the mold recess 31a. The center mold protrusion 31b is located between the pair of first projections 22b. Both side mold protrusions 31b can abut against the corners of the distal end of the first conductive plate 22. That is, the mold protrusions 31b are located to avoid the first projections 22b and the second projections 23b. That is, the mold protrusions 31b project toward the distal end of the thermistor device 18 to correspond to the recess bottom wall 10e.

The size of the mold recess 31a is set such that the first conductive plate 22 and the second conductive plate 23 are accommodated in the mold recess 31a with sufficient allowance. That is, the wall surfaces of the mold recess 31a are set such that a space S is provided between the wall surfaces and the first conductive plate 22 and the second conductive plate 23 as viewed from the flat surface perpendicular direction. The protruding amount of the mold protrusions 31b is set greater than the space S.

FIGS. 3 and 4 show the position of the thermistor element 21 that could result from the manufacturing method of the present embodiment with a chain double-dashed line. The thermistor element 21 might be slightly displaced from the distal end of the first sandwiching portion 22a to slightly project toward the recess bottom wall 10e as viewed from the flat surface perpendicular direction.

The first embodiment has the following advantages.

(1) The first conductive plate 22 and the second conductive plate 23 are provided with the first projections 22b and the second projections 23b, respectively. The first projections 22b and the second projections 23b project from part of the abutment end during installation at the periphery of the first sandwiching portion 22a and the second sandwiching portion 23a as viewed from the flat surface perpendicular direction. Thus, when manufacturing the thermistor device 18, even if the thermistor element 21 slightly projects from the first sandwiching portion 22a and the second sandwiching portion 23a as viewed from the flat surface perpendicular direction, the thermistor element 21 is prevented from abutting against the recess bottom wall 10e. This is because the first projections 22b and the second projections 23b abut against the recess bottom wall 10e. Thus, deformation of the thermistor element 21 is prevented. Furthermore, if the solder is squeezed out of the flat surfaces of the thermistor element 21, the solder is prevented from being squashed by abutting against the recess bottom wall 10e. That is, the first conductive plate 22 is prevented from being directly conducted to the second conductive plate 23 and not via the thermistor element 21.

The first projections 22b and the second projections 23b are located at the distal end of the thermistor device 18 in the insertion direction into the accommodating recess 10d. Thus, the thermistor element 21 is reliably prevented from abutting against the recess bottom wall 10e. When inserting the thermistor device 18 in the accommodating recess 10d, the distal end of the thermistor device 18 is pressed against the recess bottom wall 10e. However, the first projections 22b and the second projections 23b reliably prevent the thermistor element 21 from abutting against the recess bottom wall 10e. Thus, deformation of the thermistor element 21 is reliably prevented. Also, short-circuit between the first conductive plate 22 and the second conductive plate 23 is also reliably prevented.

(2) The mold 31 includes the mold protrusions 31b, which extend while avoiding the first projections 22b and the second projections 23b. The mold protrusions 31b project toward the distal end of the first conductive plate 22 and the second conductive plate 23 in the insertion direction. Thus, the mold protrusions 31b prevent the thermistor element 21 from projecting more than the first projections 22b and the second projections 23b. Thus, the thermistor device 18 that prevents deformation of the thermistor element 21 is easily manufactured.

(3) The wall surfaces of the mold recess 31a are set such that the space S is provided between the wall surfaces and the first conductive plate 22 and the second conductive plate 23 as viewed from the flat surface perpendicular direction. Thus, the first conductive plate 22 and the second conductive plate 23 are easily accommodated in the mold recess 31a, and the accommodating procedure is easily automated.

The mold protrusions 31b are set to project more than the space S. Thus, in the mold recess 31a, the thermistor element 21 is prevented from projecting more than the first projections 22b and the second projections 23b.

Figure 5:
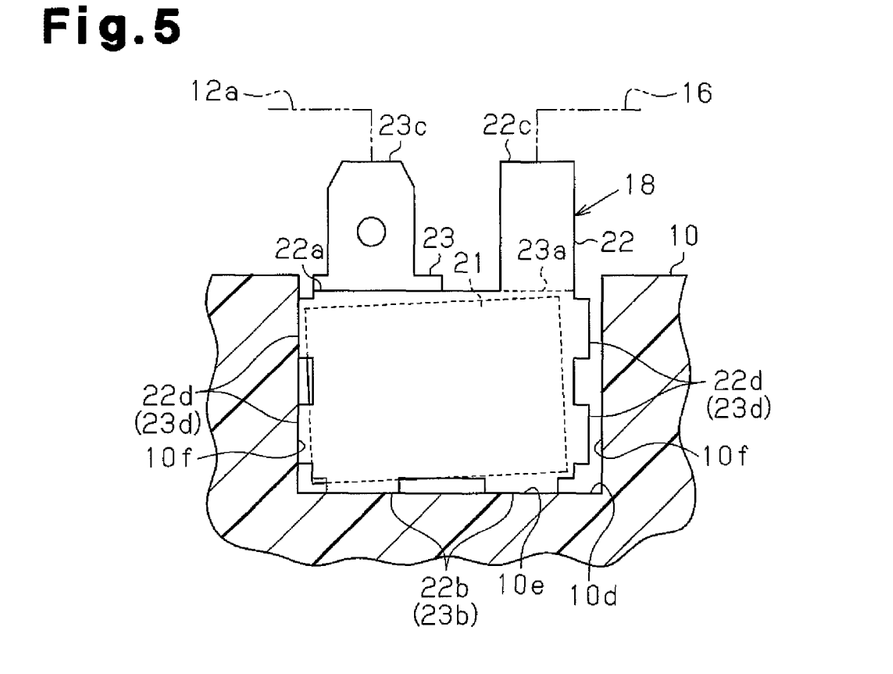
FIG. 5 is a longitudinal cross-sectional view illustrating a thermistor device and an accommodating recess according to a second embodiment.
Figure 6:
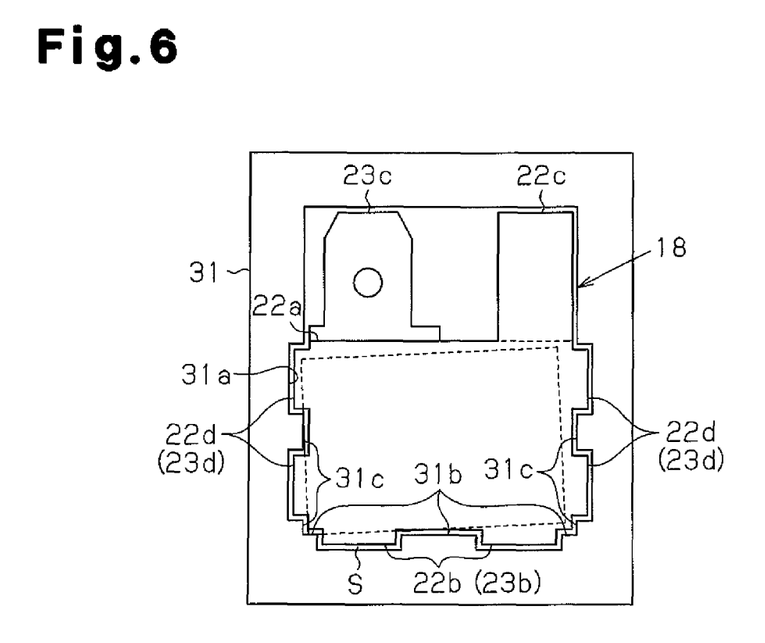
FIG. 6 is a front view illustrating a mold used in a method for manufacturing the thermistor device of FIG. 5.

FIGS. 5 and 6 show a second embodiment of the present invention.

A first conductive plate 22 of the second embodiment further includes four side projections, which are third projections 22d. Two of the third projections 22d are arranged on a first side surface of the first conductive plate 22 and the other two of the third projections 22d are arranged on a second side surface of the first conductive plate 22 with respect to the insertion direction. That is, in a state where the thermistor device 18 is accommodated in the accommodating recess 10d, the third projections 22d are arranged at part of the end portion of the thermistor device 18 that might abut against the recess side walls 10f.

The second conductive plate 23 also includes four side projections, which are fourth projections 23d.

As shown in FIG. 6, the mold 31 of the second embodiment includes second mold protrusions 31c, which avoid the third projections 22d and the fourth projections 23d. The second mold protrusions 31c project toward the side walls of the first conductive plate 22 and the second conductive plate 23 to correspond to the recess side walls 10f.

FIGS. 5 and 6 show a possible position of the thermistor element 21 in the mold 31 of FIG. 6 with a chain double-dashed line. The thermistor element 21 might be slightly displaced to slightly project toward the recess bottom wall 10e and the recess side wall 10f as viewed from the flat surface perpendicular direction.

The second embodiment further has the following advantages.

(4) The first conductive plate 22 further includes the third projections 22d located on the side surface with respect to the insertion direction. The second conductive plate 23 also further includes the fourth projections 23d located on the side surface. Thus, even if the thermistor element 21 slightly projects from the first conductive plate 22 and the second conductive plate 23 in the mold recess 31a, the thermistor element 21 is prevented from abutting against the recess side walls 10f. Thus, deformation of the thermistor element 21 is reliably prevented. The short-circuit between the first conductive plate 22 and the second conductive plate 23 is also reliably prevented.

Figure 7:
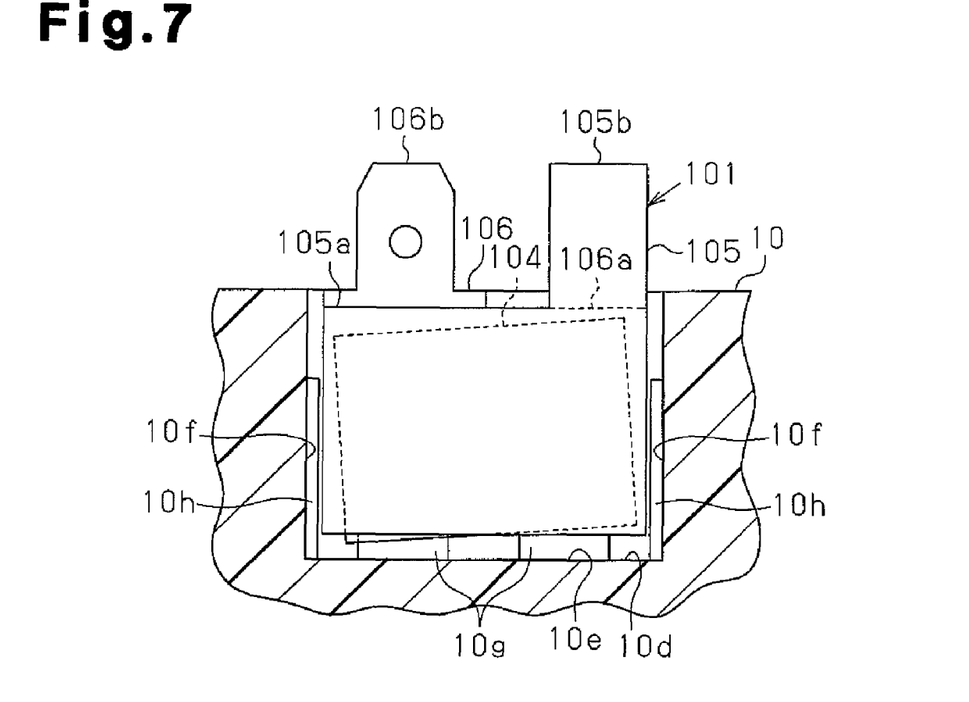
FIG. 7 is a longitudinal cross-sectional view illustrating a thermistor device and an accommodating recess according to a third embodiment.
Figure 8:
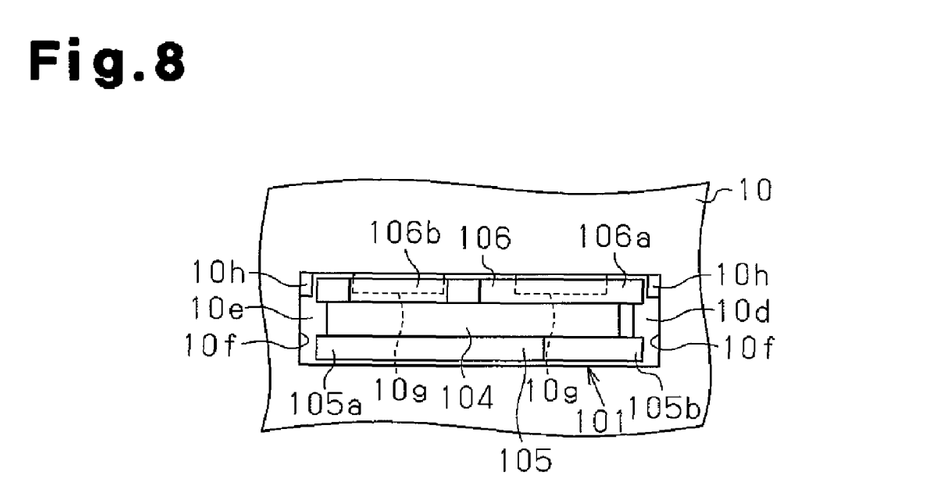
FIG. 8 is a plan view illustrating the thermistor device and the accommodating recess of FIG. 7.
Figure 9:
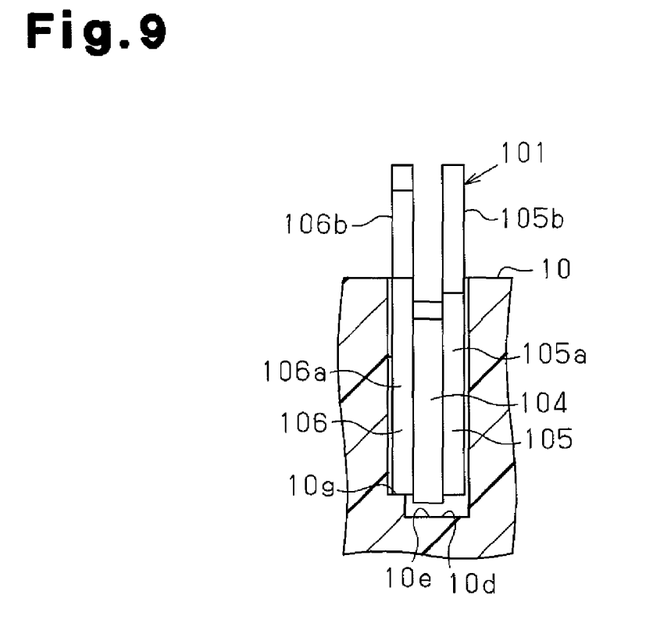
FIG. 9 is a side cross-sectional view illustrating the thermistor device and the accommodating recess of FIG. 7.

FIGS. 7 to 9 show a third embodiment of the present invention.

An accommodating recess 10d of the third embodiment is provided with a pair of fifth projections 10g and a pair of sixth projections 10h. The thermistor device 101 of the third embodiment does not include any first projections 22b, second projections 23b, third projections 22d, or fourth projections 23d. That is, the thermistor device 101 of the third embodiment is identical to that of FIGS. 10 and 11.

The fifth projections 10g are located at the recess bottom wall 10e. As shown in FIG. 9, the fifth projections 10g abut against only the distal end of the second conductive plate 106. That is, the fifth projections 10g abut against the thermistor device 101 in a range that corresponds to the thermistor device 101 except the thermistor element 104. That is, the fifth projections 10g do not abut against the thermistor element 21. For example, the thickness of the fifth projections 10g is set less than or equal to the thickness of the second conductive plate 23.

The sixth projections 10h are recess side projections located on the recess side walls 10f. That is, the sixth projections 10h abut against only the side surfaces of the second conductive plate 106 without contacting the thermistor element 21. That is, the sixth projections 10h abut against the thermistor device 101 in a range that corresponds to the thermistor device 101 except the thermistor element 104.

The third embodiment has the following advantages.

(5) Even if the thermistor element 104 slightly projects from the periphery of the first sandwiching portion 105a and the second sandwiching portion 106a, the thermistor element 104 is prevented from abutting against the recess bottom wall 10e and the recess side walls 10f. This is because the fifth projections 10g abut against the distal end of the second conductive plate 106, and the sixth projections 10h abut against the side surfaces of the second conductive plate 106. Thus, deformation of the thermistor element 104 is prevented.

Also, the first conductive plate 105 is prevented from being short-circuited to the second conductive plate 106.

(6) The fifth projections 10g are located at the recess bottom wall 10e. Thus, the thermistor element 104 is prevented from abutting against the recess bottom wall 10e. When inserting the thermistor device 101 in the accommodating recess 10d, the distal end of the thermistor device 101 in the insertion direction is strongly pressed against the recess bottom wall 10e, but the thermistor element 104 is reliably prevented from abutting against the recess bottom wall 10e. Thus, deformation of the thermistor element 104 is reliably prevented. Also, even if the solder is squeezed out of the flat surfaces of the thermistor element 104, the solder is reliably prevented from being squashed. That is, the first conductive plate 105 is reliably prevented from being short-circuited to the second conductive plate 106.

The sixth projections 10h are located on the recess side walls 10f. Thus, the thermistor element 104 is prevented from abutting against the recess side walls 10f. This is because the sixth projections 10h abut against the side surfaces of the second conductive plate 106.

The above embodiments may be modified as follows.

The fifth projections 10g and the sixth projections 10h of FIGS. 7 to 9 do not have to abut against only the second conductive plate 106, but may also abut against the first conductive plate 105.

The thermistor device 18 may be provided with the first projections 22b and the second projections 23b, and the accommodating recess 10d may be provided with the fifth projections 10g and the sixth projections 10h.

The thermistor device 18 does not need to be accommodated in the accommodating recess 10d. The end bracket 10 may be retained by structures other than the accommodating recess 10d. End portions of the first conductive plate 22 and the second conductive plate 23 that might abut against the end bracket 10 may be provided with projections.

The thermistor element 21 does not need to be the PTC element. Changes in electric resistance of the thermistor element in accordance with temperature changes may be any level as long as it is greater than changes in electric resistance of the first conductive plate 22 and the second conductive plate 23.

The shapes and numbers of the first projections 22b, the second projections 23b, the third projections 22d, the fourth projections 23d, the fifth projections 10g, and the sixth projections 10h may be modified.

The second projections 23b and the fourth projections 23d may be omitted from the second conductive plate 23, and at least one of the first projections 22b and the third projections 22d may be provided only on the first conductive plate 22. This reduces material costs.

The conductive connecting members that electrically connect and secure the thermistor element 21 to the first conductive plate 22 and the second conductive plate 23 do not need to be solder.

The motor 1 does not need to be used as the driving source of the power seat apparatus of the vehicle, but may be used as a driving source of other apparatuses. The thermistor device 18 may be provided in apparatuses other than a motor.

The invention claimed is:

1. A motor powered by a power source, the motor comprising:
    an armature;
    a feeder section electrically connectable to the power source;
    a thermistor device that is electrically connected to the feeder section so as to configure part of an electrical path from the feeder section to the armature; and
    an accommodating and retaining member including a recess defining wall, the recess defining wall defining an accommodating recess for accommodating the thermistor device,
    the thermistor device including:
    a plate-like thermistor element including a first flat surface and a second flat surface facing away from one another, the thermistor device being inserted in the accommodating recess along the first flat surface, wherein the direction in which the thermistor device is inserted in the accommodating recess is specified as an insertion direction, wherein the wall surface includes a bottom wall with respect to the insertion direction; and
    a first conductive plate and a second conductive plate sandwiching the thermistor element, wherein changes in electric resistance of the thermistor element in accordance with temperature changes being greater than changes in electric resistance of each of the first conductive plate and the second conductive plate, the first conductive plate including a first sandwiching portion secured to the first flat surface by a first conductive connecting member, the second conductive plate including a second sandwiching portion secured to the second flat surface by a second conductive connecting member, the shape of the first sandwiching portion being substantially the same as the shape of the first flat surface, and the shape of the second sandwiching portion being substantially the same as the shape of the second flat surface,
    wherein at least one of the first conductive plate and the second conductive plate is provided with a projection extending below said conductive plate in the insertion direction,
    wherein the projection is located on at least one of the distal end of the first conductive plate and the distal end of the second conductive plate, the projection is facing the recess bottom wall, wherein the projection does not overlap the contact areas of the first and second conductive plates.

2. The motor according to claim 1,
    wherein the first conductive plate and the second conductive plate each have a side surface facing a direction perpendicular to the insertion direction, and
    wherein at least one of the first conductive plate and the second conductive plate is provided with a side projection.

3. The motor according to claim 1,
    wherein the recess defining wall includes a recess side wall facing a direction perpendicular to the insertion direction, and
    wherein the recess defining wall is provided with a recess side projection, the recess side projection abutting against the thermistor device in a range that corresponds to the thermistor device except the thermistor element when the thermistor device is viewed from a direction extended from the first flat surface in a state where the thermistor device is accommodated in the accommodating recess.

* * * * *